United States Patent
Knaappila (10) Patent No.: US 9,479,892 B2
(45) Date of Patent: Oct. 25, 2016

(54) METHOD AND TECHNICAL EQUIPMENT FOR SHORT RANGE DATA TRANSMISSION

(71) Applicant: Silicon Laboratories Finland Oy, Espoo (FI)

(72) Inventor: Jere Knaappila, Evitskog (FI)

(73) Assignee: Silicon Laboratories Finland Oy, Espoo (FI)

( * ) Notice: Subject to any disclaimer, the term of this patent is extended or adjusted under 35 U.S.C. 154(b) by 132 days.

(21) Appl. No.: 14/219,431

(22) Filed: Mar. 19, 2014

(65) Prior Publication Data

US 2014/0328210 A1   Nov. 6, 2014

(30) Foreign Application Priority Data

May 3, 2013   (FI) ..................................... 20135459

(51) Int. Cl.

| | |
|---|---|
| *H04W 4/00* | (2009.01) |
| *H04W 52/02* | (2009.01) |
| *H04W 56/00* | (2009.01) |
| *H04N 13/04* | (2006.01) |
| *H04N 13/00* | (2006.01) |
| *H04W 84/20* | (2009.01) |

(52) U.S. Cl.
CPC ......... *H04W 4/008* (2013.01); *H04W 52/0209* (2013.01); *H04W 56/0015* (2013.01); *H04N 13/0051* (2013.01); *H04N 13/0497* (2013.01); *H04W 84/20* (2013.01)

(58) Field of Classification Search
None
See application file for complete search history.

(56) References Cited

U.S. PATENT DOCUMENTS

| | | | |
|---|---|---|---|
| 2008/0057990 A1* | 3/2008 | Fuccello | H04W 76/02 455/507 |
| 2010/0056054 A1 | 3/2010 | Yamato et al. | |
| 2011/0021142 A1 | 1/2011 | Desai et al. | |
| 2012/0052802 A1 | 3/2012 | Kasslin et al. | |
| 2012/0083210 A1 | 4/2012 | Cutrignelli | |
| 2012/0196534 A1 | 8/2012 | Kasslin et al. | |
| 2012/0328061 A1* | 12/2012 | Chow | H04W 56/0015 375/354 |
| 2013/0003630 A1 | 1/2013 | Xhafa et al. | |
| 2013/0235166 A1* | 9/2013 | Jones | H04N 13/04 348/51 |

FOREIGN PATENT DOCUMENTS

| | | |
|---|---|---|
| EP | 2509343 A2 | 10/2012 |
| WO | WO2014/068366 A1 | 5/2014 |

OTHER PUBLICATIONS

Andrew S. Tanenbaum; "Computer Networks—Third Edition" In: "Computer Networks—Third Edition", Dec. 31, 1996; Prentice Hall International, NJ; pp. 264-265.
Search Report, EP14397511.8, May 13, 2014, pgs.
Search Report Office Action; FI20135459, Feb. 10, 2014, 6 pgs.

* cited by examiner

*Primary Examiner* — Vinncelas Louis
(74) *Attorney, Agent, or Firm* — Egan, Peterman, Enders & Huston LLP (57) ABSTRACT

A method, an apparatus, a system and a computer program product are provided for Bluetooth low energy technology. The method may be carried out by a Bluetooth low energy module. The method may include: detecting an advertisement packet from an advertising device; extracting time information of the advertisement packet; generating a new time information on the basis of the extracted time information; and sending an advertisement packet at the new time information. A system may include a plurality of advertising devices that implement the method, with one of the advertising devices being a master advertiser, and the other advertising devices being slave advertisers.

23 Claims, 5 Drawing Sheets

METHOD AND TECHNICAL EQUIPMENT FOR SHORT RANGE DATA TRANSMISSION

CROSS-REFERENCE TO RELATED APPLICATIONS

This application claims priority under 35 USC §119 to Finnish patent application 20135459 filed on May 3, 2013, the disclosure of which is incorporated herein by reference in its entirety.

TECHNICAL FIELD

The present invention relates to Bluetooth low energy. In particular, the present invention relates to advertising in Bluetooth low energy.

BACKGROUND

Bluetooth Low Energy (BLE) relates to Bluetooth wireless radio technology. It has been designed for low-power and low latency applications for wireless devices within short range. Today, typical BLE applications can be found from healthcare, fitness, security, smart energy, industrial automation and home entertainment. However, BLE is not limited only those, but increasingly more new applications utilizing BLE technology are designed.

The difference between BLE and classic Bluetooth is that the BLE devices consume remarkably less power for communication than classic Bluetooth devices. In addition, the BLE is able to start the data transmission quicker than the classic Bluetooth. This makes it possible to have BLE devices constantly on and to communicate intermittently with other devices.

When there are multiple devices with BLE capability in close proximity, the continuous data transfer may cause interferences or collision of packets. There is, therefore, a need for a solution that improves the technology of BLE modules to avoid these problems.

SUMMARY

Now there has been invented a method and technical equipment implementing the method, by which the above problems are alleviated.

According to a first aspect, a method comprises detecting an advertisement packet from an advertising device; extracting time information of the advertisement packet; generating a new time information on the basis of the extracted time information; and sending an advertisement packet at the new time information.

According to a second aspect, an apparatus comprises processing means and memory means, wherein the apparatus is configured to detect an advertisement packet from an advertising device; extract time information of the advertisement packet; generate a new time information on the basis of the extracted time information; and send an advertisement packet at the new time information.

According to a third aspect, a system comprises a plurality of advertising devices, wherein one of the advertising device is a master advertiser, and the other advertising devices is slave advertisers, wherein each slave advertiser is configured to detect an advertisement packet from a master advertiser; extract time information of the advertisement packet; generate a new time information on the basis of the extracted time information; and send an advertisement packet at the new time information.

According to a fourth aspect, a computer program product embodied on a non-transitory computer readable medium, comprising computer program code configured to, when executed on at least one processor, cause an apparatus or a system to: detect an advertisement packet from an advertising device; extract time information of the advertisement packet; generate a new time information on the basis of the extracted time information; and send an advertisement packet at the new time information.

According to an embodiment, the new time information is generated by adding an offset to the extracted time information.

According to an embodiment, the advertisement packet is detected by means of an address of the advertising device.

According to an embodiment, the advertisement packet is detected from a data contained in said advertisement packet.

According to an embodiment, the time information of the advertisement packet is $T\_advEvent_{main}=advInterval+advDelay$, where advInterval is an interval between advertisement packets, and advDelay is a pseudo-random number.

According to an embodiment, the new time information is $T\_advEvent_{adv}=T\_advEvent_{main}+offset$, where offset is configuration data.

According to an embodiment, the apparatus carrying out the method is a Bluetooth low energy module.

DESCRIPTION OF THE DRAWINGS

In the following, various embodiments of the invention will be described in more detail with reference to the appended drawings, in which.

DESCRIPTION OF EXAMPLE EMBODIMENTS

Figure 1:
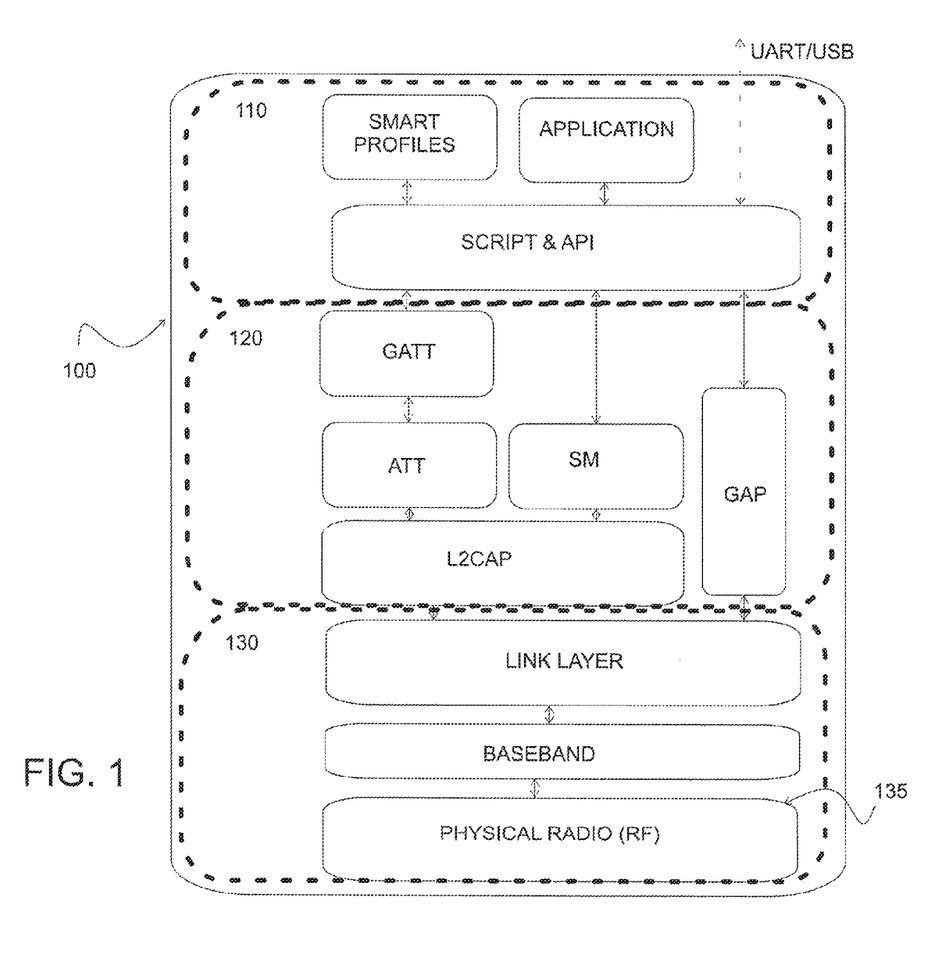
FIG. 1 shows a Bluetooth module according to an embodiment.

FIG. 1 illustrates an example of an electronic apparatus 100. According to an embodiment, the apparatus 100 is a Bluetooth module that comprises application layer 110, host layer 120 and a Bluetooth (or BLE) controller 130. The application layer 110 comprises the apparatus related application(s) (e.g. heart rate, proximity, blood pressure, time update, temperature, battery, . . . ), smart profiles, script and application programming interface (API). The application is capable of reading sensor data e.g. from heart rate sensor, and reporting the data to host layer for transmitting the data by means of the Bluetooth Controller. The host layer 120 comprises protocols running over the connection. Host layer 120 also comprises data to be used in advertisement packet. In FIG. 1, the host layer 120 is shown to comprise generic attribute profile (GATT), generic access profile (GAP), attribute protocol (ATT), security manager (SM) and logical link control and adaptation protocol (L2CAP). The Bluetooth (or BLE) controller 130 comprises link layer, baseband and physical layer (i.e. physical radio, radio frequency RF).

The link layer provides ultra-low power idle mode operation and device discovery (i.e. connection mode and advertising mode handling). The link layer also is in charge for packet transmission and responding.

Figure 2:
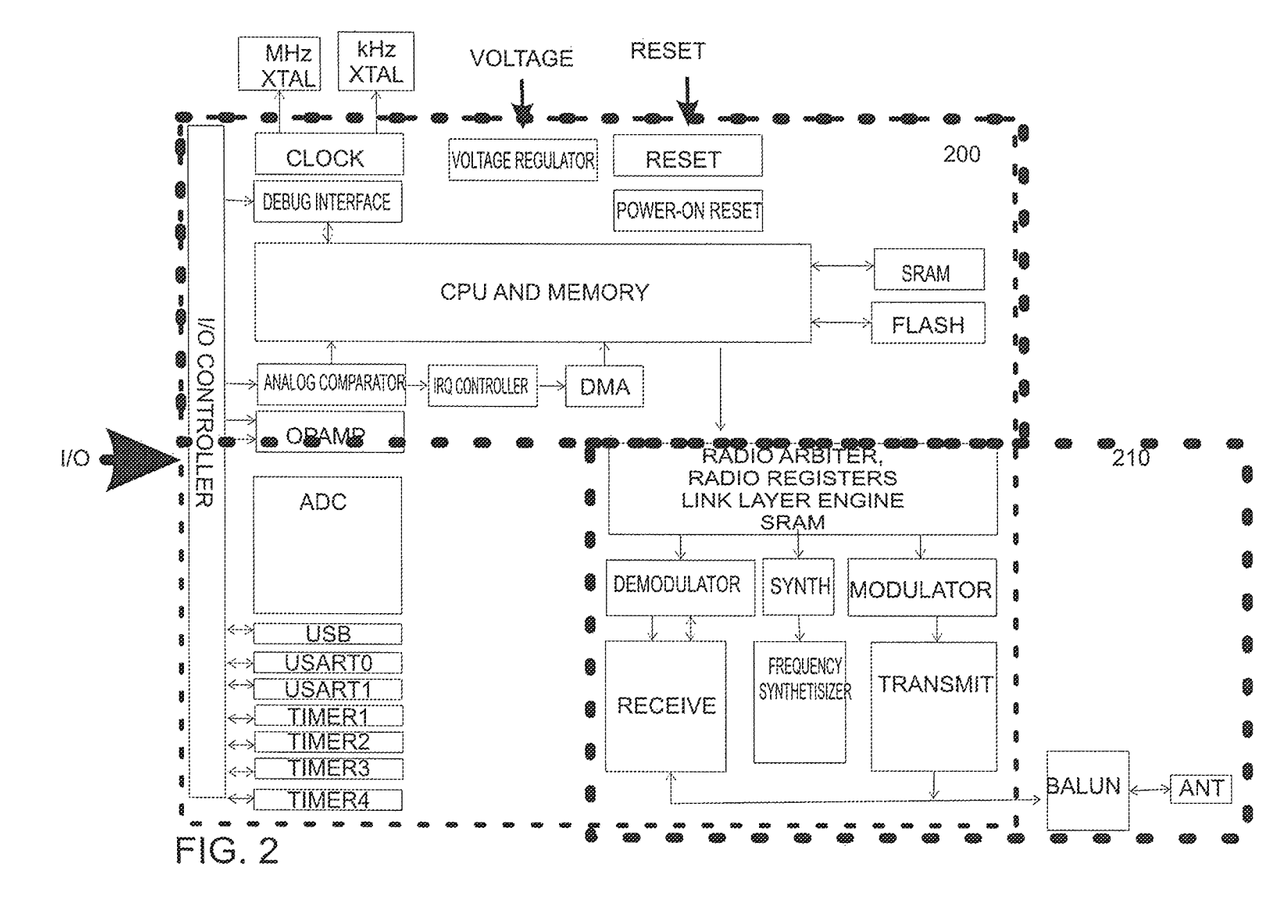
FIG. 2 shows a simplified block chart of a Bluetooth module.

FIG. 2 illustrates an example of a BLE module available on the market as a simplified block diagram. Central processing unit and memory means with application data is located in segment 200. A part of the link layer and physical layer is illustrated with reference 210. This segment 210 contains elements, such as radio registers, link layer engine, modulator-demodulator, receiving-transmitting means, frequency synthetisizer, balancing-unbalancing unit (balun), antenna (ant). The segment 210 is a detailed illustration of the element "physical radio (RF)" 135 in FIG. 1. The segment 200 on the other hand is a detailed illustration of the layers 110-130 in FIG. 1 without the element "physical radio (RF)" 135.

In BLE technology, a number of slave devices can be connected to a master device. The master is able to communicate with one or more slave devices, also simultaneously. To let the master know about the slave devices, the slave devices (or at that point "advertisers") periodically pass advertisement packets which a scanning device (i.e. "scanner") is scanning. When the scanner connects to an advertiser, the advertiser is called "a slave" and the scanner is called "a master".

As said, more than one slave can be connected to the master. Therefore, also a numerous amount of advertisement packets travels over the air. However, the advertisers are not synchronized, which may cause interference if there are e.g. hundreds of devices in close proximity. The interference may cause loss of packets.

Prior the invention, the devices in advertiser mode (i.e. "advertisers") are required to use a random delay in advertisement packets to reduce device interference if multiple devices advertise at the same time and same interval. T_advEvent specifies the time when an advertisement packet from an advertiser is transmitted, T_advEvent=advInterval+advDelay, where advInterval is an interval between advertising events (i.e. advertisement packets), e.g. 20 ms to 30 ms. advDelay is a pseudo-random number within a range 0 ms to 10 ms. advDelay is generated by the BLE link-layer for each advertising event.

However, much more reliable advertising can be achieved by synchronizing the advertisers according to an embodiment of the invention. In this embodiment, a "master" advertiser is selected among a group of advertisers. When such "master advertiser" is selected, the rest of the advertisers are "slave advertisers". In order to utilize the present embodiment, the advertisers are able to perform both scanning and advertising.

The master advertiser may be configured in advance, or it can be selected "on the fly". In both cases, the selected master advertiser may advertise with a specific advertisement packet which the slave advertisers are able to detect and use to determine which advertisement packet originated from the master advertiser. For example, a master advertiser's advertisement packets' payload may contain information that this is the master advertiser. The payload may contain, for example, an identification of the usable Bluetooth/BLE network. As an alternative, the address of the master advertiser may be stored in the memory of the slave advertisers as a configuration data. It is to be noticed, that this "master advertiser" may be different from the scanner who will act as the master after connection, as will be shown in FIG. 4a. As an alternative, the master advertiser 320 is the scanner 350.

When a slave advertiser either knows the address of the master advertisers or knows the specific packet of the master advertisers, the slave advertiser is able to scan the packet in the air. When such a packet is detected, the slave advertiser is able to extract T_advEvent$_{main}$ of the master advertisement packet from the packet, which T_advEvent$_{main}$ is to be utilized in the advertisement packets of the slave advertiser. T_advEvent$_{main}$ of the master advertisement packet is in the form of advInterval+advDelay as described above. advInterval is selected in advance, either configured by a user or by application. advDelay is a pseudorandom number generated at each interval. T_advEvent$_{main}$ is used to send advertisement packets from the master advertiser, and T_advEvent$_{main}$ is relative to the previous advertisement packet from the master advertiser.

The previous process, i.e. scanning the master advertisement packet, is performed by each of the slave advertisers, whereby each of them will know T_advEvent$_{main}$ of the master advertisement packet. This T_advEvent$_{main}$ of the master advertisement packet is completed by the slave advertisers with a specific offset to generate T_advEvent$_{adv}$ for the slave advertisement packet. The specific offset is configuration data in the slave advertising device, meaning that it may be stored in the device in advance. When the configuration data is defined for different devices, it is taken care of that different devices have different offsets. This kind of operation makes it possible to synchronize the slave advertisers to the "master advertiser". The synchronization in this example means that the advertisement packets of the slave advertisers are transmitted at different times to prevent collisions and interference.

So, instead of using a pseudo-random number that is received from the link-layer, the T_advEvent$_{main}$ of the master advertiser is utilized by the slave advertisers in the present embodiments. The slave advertisers schedule their own advertisement times by adding an accurate offset to the T_advEvent of the master advertisement packet as follows: T_advEvent$_{adv}$=MasterAdv+offset, where MasterAdv is T_advEvent$_{main}$=AdvInterval+AdvDelay of the master advertiser. As said, the offset, replacing the pseudo-random number, may be configuration data being defined for each slave advertiser in advance. Instead, the master advertiser may configure the offset for the slave advertiser (i.e. "slave-offset") by delivering the slave-offset in its advertisement packet. Yet as a further alternative, the master advertiser may open a connection with the slave advertiser and configure the slave-offset through the connection. The offset may also then be stored in the configuration data of the slave advertiser.

In an embodiment, each offset is a multiple of 2.5 ms, whereby up to 400 advertisers are allowed during one second with no overlap. However, the invention is not limited to this embodiment, but the offset can be any time value.

T_advEvent$_{adv}$ of the slave advertisement packets are updated every time a new advertisement packet from a master advertiser is transmitted to keep the slave advertisers in synchronization. As an alternative, a random number can be shared between slave advertising devices, so they can choose the same pseudorandom offset. This may be contained in the configuration data of the slave advertiser, or in the advertisement packet of the master advertiser. In the latter case, the master advertisement packets should still be scanned to compensate the clock jitter.

If a new advertisement packet from the master advertiser is missed by the slave advertisers, the synchronization of the slave advertiser is lost. In that case, the slave advertisers need to scan the advertisement packets again, until an advertisement packet from the master advertisers is found.

Figure 3:
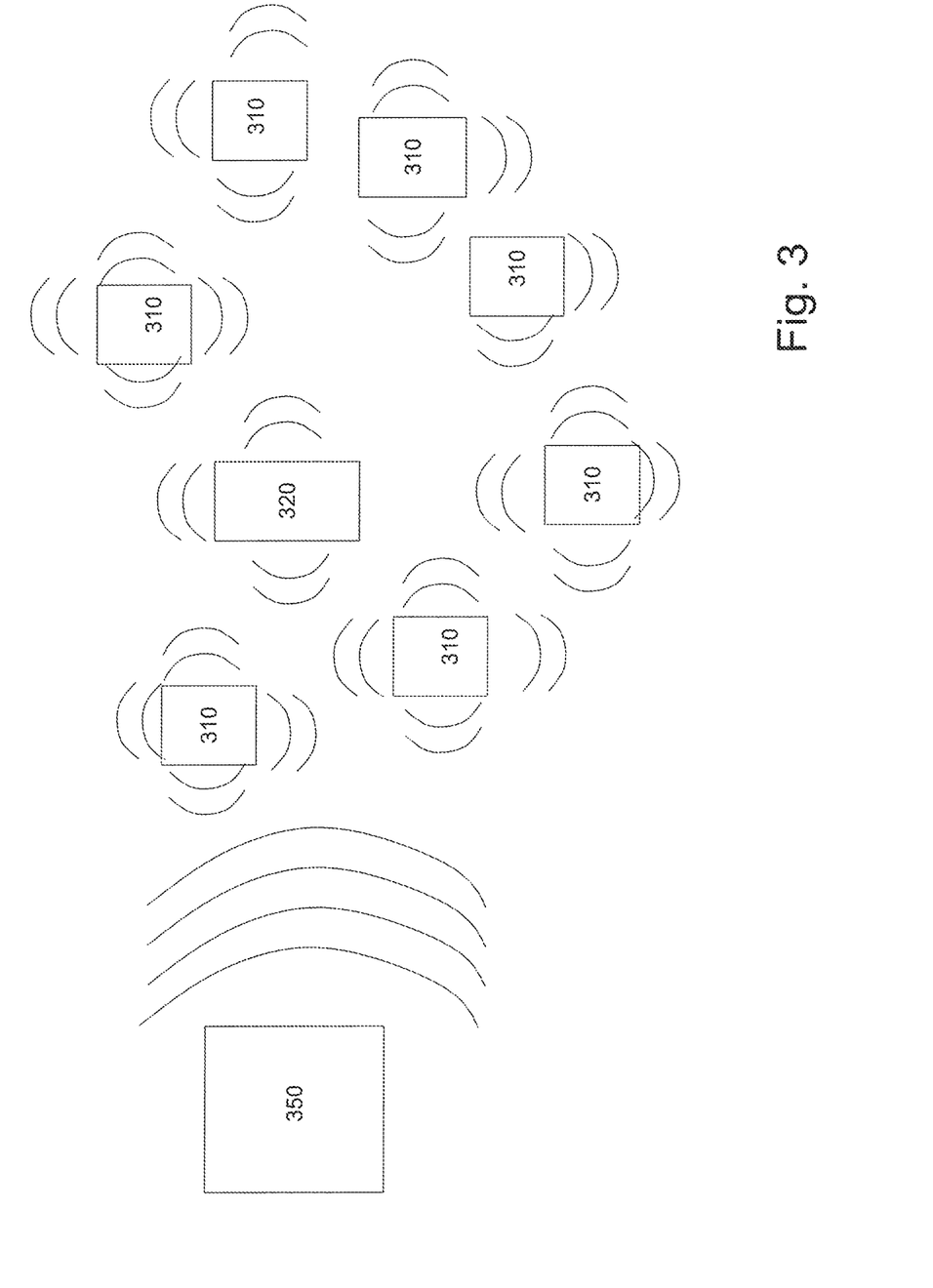
FIG. 3 shows a simplified example of a system comprising plurality of advertising devices.
Figure 4A:
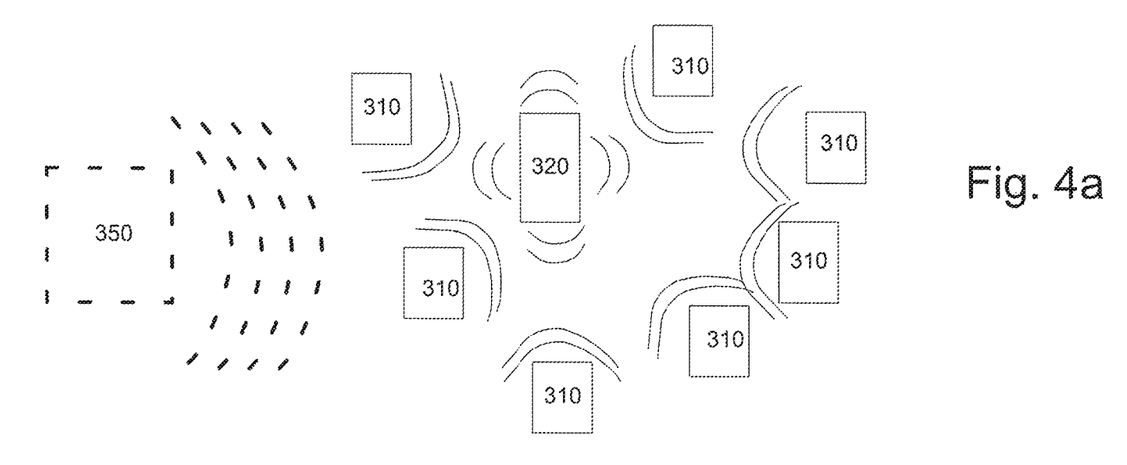
FIGS. 4a-4b show a simplified example of a system accoding to an embodiment, said system comprising plurality of advertising device.
Figure 4B:
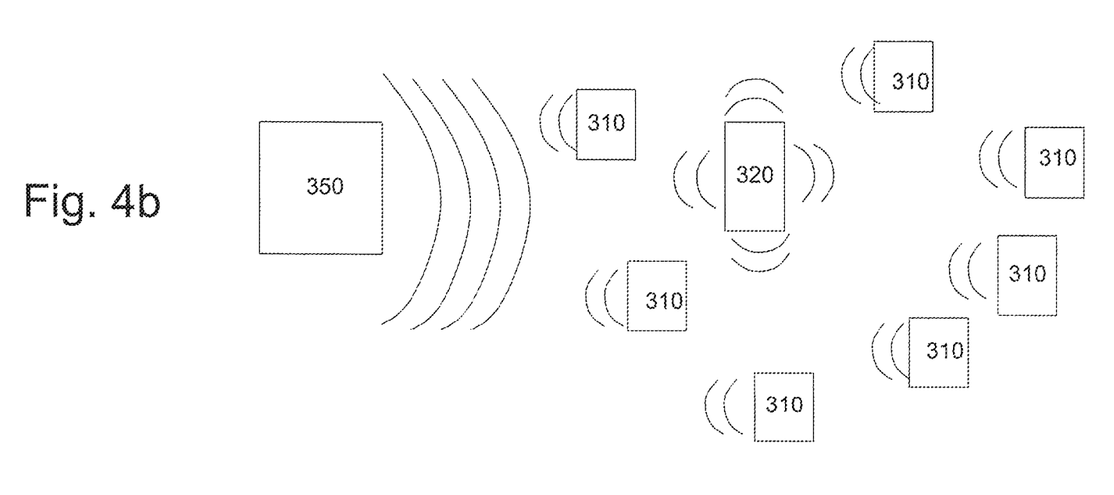

FIGS. 3-4 illustrate examples of the system comprising a plurality of advertisers. FIG. 3 is a configuration with a scanner 350 and advertisers 310-320. In this example, the scanner 350 may be a main computing device collecting data from a plurality of advertisers 310-32. For example, in a gym, the scanner 350 may be a device of a service provider, whereas the advertisers 310-320 are heart rate monitors of athletes. The scanner 350 may receive heart rate data from the advertisers 310-320 to create a report of the sports event. Another example is that the scanner 350 is a central medical apparatus, and the advertisers 310-320 are medical sensors. It is appreciated that these examples do not limit the invention, but are provided for understanding purposes only. Typically the advertising event may go on according to an example of FIG. 3. The advertisers 310-320 transmit advertisement packets, and the scanner 350 scans the packets in order to form a connection with one or more of the advertisers 310-320. In this situation, each advertiser 310-320 sends the advertisement packet at T_advEvent=advInterval+advDelay where advDelay is a pseudorandom number from a link layer.

FIG. 4a illustrates a similar situation having a scanner 350 and plurality of advertisers 310-320, but FIG. 4a illustrates the operation according to present embodiments. What is different to FIG. 3 is that one of the advertisers is a master advertiser 320, packets from which the other advertisers 310 are scanning. After having received an advertisement packet at $T\_advEvent_{main}$ from the master advertiser 320, the slave advertisers 310 determine their own advertisement packets to be send at the time defined by the master advertisement packet and added with an offset, i.e. $T\_advEvent_{adv}$. These generated advertisement packets are scanned by the scanner 350 as shown in FIG. 4b. If the master advertiser 320 sends another advertisement packet, the slave advertisers 310 update the advertisement packet time accordingly.

When the scanner 350 wishes to connect with one or more of the advertisers 310-320, the scanner performs the connection initiation by sending a connection request (CONNECTION_REQ) to the advertisers 310-320. After the connection is formed, the devices 310-320 may transmit application data to the central device 350.

In the example of FIGS. 4a-4b, the master advertiser 320 and the scanner 350 are different devices. However, the scanner 350 may be the master advertiser whereby the advertiser 320 is a slave advertiser as devices 310.

Figure 5:
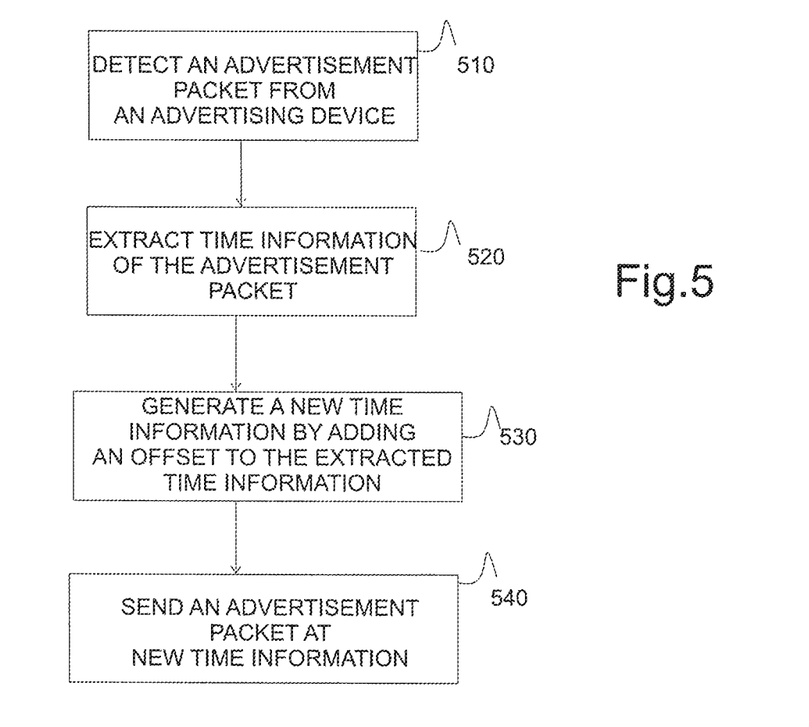
FIG. 5 is a flowchart of a method according to an embodiment.

FIG. 5 illustrates a flowchart according to an embodiment. The method according to embodiment comprises detecting an advertisement packet from an advertising device; extracting time information of the advertisement packet; generating a new time information by adding an offset to the extracted time information; sending an advertisement packet at a new time information.

The various embodiments may provide advantages. Synchronization of advertisers generates more reliable advertising because packet losses can be avoided. Therefore, the variety of applications using BLE can be expanded towards even more critical solutions, where packet losses are even more undesired. An example of such an application is a medical application, where wireless ECG sensors (electrocardiography) based on BLE transmits heart-related data to a monitor. This is an application, where synchronization of the advertisers is very important for accurate timing.

The various embodiments of the invention can be implemented with the help of computer program code that resides in a memory and causes the relevant BLE enabled devices, i.e. an apparatus comprising the BLE module, to carry out the invention.

It is obvious that the present invention is not limited solely to the above-presented embodiments, but it can be modified within the scope of the appended claims.

What is claimed is:

1. A method, comprising using a Bluetooth low energy (BLE) enabled apparatus to perform the following steps as a first advertising device:
   detecting a first BLE advertisement packet received from a second BLE advertising device;
   extracting time information of the first BLE advertisement packet, the extracted time information being the transmission time of the first BLE advertisement packet from the second BLE advertising device relative to a previous transmitted BLE advertisement packet from the second BLE advertising device;
   generating a new time information on the basis of the extracted time information by adding an offset from memory of the apparatus to the extracted time information; and
   sending a second BLE advertisement packet from the apparatus at the generated new time information;
   wherein the extracted time information of the detected first advertisement packet is $T\_advEvent_{main}$ that is used by the second BLE advertising device to transmit the first advertisement packet, and is determined by the following relationship:
   $T\_advEvent_{main}$=advInterval+advDelay, where advInterval is an interval between advertisement packets, and advDelay is a pseudo-random number; and
   wherein the new time information used by the first advertising device to transmit the second BLE advertisement packet is $T\_advEvent_{adv}$, and is generated from the following relationship:
   $T\_advEvent_{adv}$=$T\_advEvent_{main}$+offset, where the offset is configuration data stored in advance in the memory of the apparatus.

2. The method according to claim 1, wherein the offset is stored in advance in the memory of the apparatus instead of being delivered to the apparatus in an advertisement packet.

3. The method according to claim 1, where the second advertising device is operating as a master advertising device to transmit the first BLE advertisement packet as a master advertisement packet; and wherein the first BLE advertisement packet is detected as being the master advertisement packet by the first advertising device by using an address of the master advertising device.

4. The method according to claim 1, where the second advertising device is operating as a master advertising device to transmit the first BLE advertisement packet as a master advertisement packet; and wherein the first BLE advertisement packet is detected as being the master advertisement packet by the first advertising device from a data contained in said first BLE advertisement packet.

5. The method of claim 1, where the second advertising device is operating as a master advertising device to transmit the first BLE advertisement packet as a master advertisement packet; and where the method further comprises:
   providing multiple BLE enabled devices that include the first and second BLE advertising devices;
   selecting the second one of the BLE devices to be the master advertiser, and the other multiple BLE enabled devices to be slave advertisers; and
   operating the multiple BLE enable devices in advertising mode to:
   transmit the first advertisement packet from the master advertiser to the other multiple BLE enabled apparatus at $T\_advEvent_{main}$;

then detect in each of the slave advertisers that the first BLE advertisement packet is transmitted by the master advertiser, and then extract $T\_advEvent_{main}$ of the first BLE advertisement packet in each of the slave advertisers, then generate a new time information in each of the slave advertisers that is equal to $T\_advEvent_{adv}$, and then sending an additional BLE advertisement packet from each of the slave advertisers at the generated new time information for each of the slave advertisers.

6. The method according to claim 5, where the offset stored in the memory of each given one of the slave advertisers is different from the offset stored in the memory of each of the other given slave advertisers such that the new time information $T\_advEvent_{adv}$ generated in each of the slave advertisers is different from the new time information $T\_advEvent_{adv}$ generated in each of the other slave advertisers, and such that additional BLE advertisement packet sent from each given one of the slave advertisers is sent at a time that is different from the time that the additional BLE advertisement packet is sent from each of the other slave advertisers.

7. The method according to claim 5, further comprising providing an additional BLE enabled device in addition to the multiple provided BLE enabled devices that are operating as master advertisers or slave advertisers in the advertising mode, and operating the additional BLE enabled device as a scanner to receive additional BLE advertisement packets sent from each of the other slave advertisers.

8. The method according to claim 7, further comprising then using the scanner to initiate and form a connection with one or more of the slave advertisers after receiving the additional BLE advertisement packets sent from the one or more of the slave advertisers; where the scanner becomes a master in the connection mode, and where each of the slave advertisers becomes a slave in the connection mode.

9. The method according to claim 7, further comprising then using the scanner to initiate and a connection with one or more of the slave advertisers after receiving the additional BLE advertisement packets sent from the one or more of the slave advertisers; where the scanner becomes a master in the connection mode, where each of the slave advertisers becomes a slave in the connection mode; and where the master advertiser is not a master in the connection mode.

10. The method according to claim 5, operating the second one of the BLE enabled devices as both the master advertiser and as a scanner to receive additional BLE advertisement packets sent from each of the other slave advertisers.

11. The method according to claim 10, further comprising then using the second one of the BLE enabled devices as the scanner to initiate and form a connection with one or more of the slave advertisers after receiving the additional BLE advertisement packets sent from the one or more of the slave advertisers; where the second one of the BLE enabled devices becomes the master in the connection mode, and where each of the slave advertisers becomes a slave in the connection mode.

12. Bluetooth low energy (BLE) enabled apparatus, comprising a processor and memory, wherein the apparatus is configured to operate as a first advertising device to:

detect a first advertisement packet received from a second BLE advertising device;

extract time information of the first advertisement packet, the extracted time information being the transmission time of the first BLE advertisement packet from the second BLE advertising device relative to a previous transmitted BLE advertisement packet from the second BLE advertising device;

generate a new time information on the basis of the extracted time information by adding an offset from the memory of the apparatus to the extracted time information; and send a second BLE advertisement packet from the apparatus at the generated new time information;

wherein the extracted time information of the detected first advertisement packet is $T\_advEvent_{main}$ that is used by the second BLE advertising device to transmit the first advertisement packet, and is determined by the following relationship:

$T\_advEvent_{main}$=advInterval+advDelay, where advInterval is an interval between advertisement packets, and advDelay is a pseudo-random number; and wherein the new time information used by the first advertising device to transmit the second BLE advertisement packet is $T\_advEvent_{adv}$, and is generated from the following relationship:

$T\_advEvent_{adv}$=$T\_advEvent_{main}$+offset, where offset is configuration data stored in advance in the memory of the apparatus.

13. The apparatus according to claim 12, wherein the offset is stored in advance in the memory of the apparatus instead of being delivered to the apparatus in an advertisement packet.

14. The apparatus according to claim 12, wherein the apparatus is configured to detect that the first advertisement packet is a master advertisement packet from the second advertising device configured as a master advertiser using an address of the second advertising device.

15. The apparatus according to claim 12, wherein the apparatus is configured to detect that the first advertisement packet is a master advertisement packet from the second advertising device configured as a master advertiser from a data contained in said first advertisement packet.

16. A system, comprising a plurality of Bluetooth low energy (BLE) enabled devices, wherein a first one of the BLE devices is configured to operate as a master advertiser, and the other BLE devices are configured to operate as slave advertisers, wherein each slave advertiser is configured to perform the following:

detect a first BLE advertisement packet received from the master advertiser;

extract time information of the first BLE advertisement packet, the extracted time information being the transmission time of the first BLE advertisement packet from the master advertiser device relative to a previous transmitted BLE advertisement packet from the master advertiser device;

generate a new time information on the basis of the extracted time information by adding an offset from memory of the slave advertiser to the extracted time information; and send a second BLE advertisement packet from the slave advertiser at the generated new time information;

wherein the extracted time information of the detected first advertisement packet is $T\_advEvent_{main}$ that is used by the master advertiser to transmit the first advertisement packet, and is determined by the following relationship: $T\_advEvent_{main}$=advInterval+advDelay, where advInterval is an interval between advertisement packets, and advDelay is a pseudo-random number; and wherein the new time information used by the slave advertiser to transmit the second BLE advertisement packet is $T\_advEvent_{adv}$, and is generated from the following relationship:

$T\_advEvent_{adv} = T\_advEvent_{main} + \text{offset}$, where offset is configuration data stored in advance in the memory of the apparatus.

17. The system according to claim 16, where the first one of the BLE advertising devices is configured to:
perform the following prior to entering the BLE advertising mode and transmitting the first advertisement packet from the master advertiser to the slave advertiser:
first open a connection with each one of the other BLE devices; and
then configure the offset for each of the other BLE devices through the connection such that the offset is stored in configuration data in the memory of each of the other BLE devices, and
then close the connection with each of the other BLE devices; and
where each of the other BLE devices are then configured to enter the BLE advertising mode as a slave advertiser and generate the new time information on the basis of the extracted time information by adding the offset from the configuration data stored in the memory of the slave advertiser to the extracted time information; and—where in the BLE advertising mode the slave advertiser is then configured to send the second BLE advertisement packet from the apparatus at the generated new time information.

18. The system according to claim 16, where the offset stored in memory of each given slave advertiser to be added to the extracted time information to generate the new time information for the given slave advertiser is different from the offset stored in the memory of each of the other slave advertisers to be added to the extracted time information to generate the new time information for each of the other slave advertisers.

19. The system of claim 16, where the offset stored in the memory of each given one of the slave advertisers is different from the offset stored in the memory of each of the other slave advertisers such that the new time information in each of the slave advertisers is different from the new time information generated in each of the other slave advertisers, and such that the second BLE advertisement packet sent from each given one of the slave advertisers is sent at a time that is different from the time that the second BLE advertisement packet is sent from each of the other slave advertisers such that the second BLE advertisement packets of the different slave advertisers are transmitted at different times to prevent collisions.

20. A computer program product embodied on a non-transitory computer readable medium, comprising computer program code configured to, when executed on at least one processor, cause a Bluetooth low energy (BLE) enabled apparatus or a system to perform the following:
detect a first advertisement packet received from a second BLE advertising device;
extract time information of the first advertisement packet, the extracted time information being the transmission time of the first BLE advertisement packet from the second BLE advertising device relative to a previous transmitted BLE advertisement packet from the second BLE advertising device;
generate a new time information on the basis of the extracted time information by adding an offset from memory of the apparatus or system to the extracted time information; and
send a second BLE advertisement packet from the apparatus or system at the generated new time information;
wherein the extracted time information of the detected first advertisement packet is $T\_advEvent_{main}$ that is used by the second BLE advertising device to transmit the first advertisement packet, and is determined by the following relationship:
$T\_advEvent_{main} = advInterval + advDelay$, where advInterval is an interval between advertisement packets, and advDelay is a pseudo-random number; and
wherein the new time information used to transmit the second BLE advertisement packet is $T\_advEvent_{adv}$, and is generated from the following relationship: $T\_advEvent_{adv} = T\_advEvent_{main} + \text{offset}$, where the offset is configuration data stored in advance in the memory of the apparatus.

21. A method, comprising operating a plurality of Bluetooth low energy (BLE) enabled devices as slave advertisers a to perform the following steps:
detecting a same first BLE advertisement packet received in each of the plurality of slave advertisers from a master advertiser;
extracting the time information of the same first BLE advertisement packet in each of the slave advertisers, the extracted time information being the transmission time of the same first BLE advertisement packet from the master advertiser device relative to a previous transmitted BLE advertisement packet from the master advertiser device;
generating a new time information in each of the plurality of slave advertisers on the basis of the extracted time information by adding an offset from memory of the slave advertiser to the extracted time information; and
sending a second BLE advertisement packet from each given one of the plurality of slave advertisers at the new time information generated in the given one of the slave advertisers;
wherein the extracted time information of the detected first advertisement packet is $T\_advEvent_{main}$ that is used by the master advertiser to transmit the first advertisement packet, and is determined by the following relationship: $T\_advEvent_{main} = advInterval + advDelay$, where advInterval is an interval between advertisement packets, and advDelay is a pseudo-random number; and
wherein the new time information used by the slave advertiser to transmit the second BLE advertisement packet is $T\_advEvent_{adv}$, and is generated from the following relationship:
$T\_advEvent_{adv} = T\_advEvent_{main} + \text{offset}$, where offset is configuration data stored in advance in the memory of the apparatus.

22. The method of claim 21, where the offset stored in the memory of each given one of the slave advertisers is different from the offset stored in the memory of each of the other slave advertisers such that the new time information in each of the slave advertisers is different from the new time information generated in each of the other slave advertisers, and such that the second BLE advertisement packet sent from each given one of the slave advertisers is sent at a time that is different from the time that the second BLE advertisement packet is sent from each of the other slave advertisers such that the second BLE advertisement packets of the different slave advertisers are transmitted at different times to prevent collisions.

23. The method of claim 21, further comprising selecting the master advertiser from a plurality of BLE devices that includes the plurality of slave advertisers; and transmitting the same first BLE advertisement packet simultaneously to each of the plurality of slave advertisers from the selected master advertiser before the step of detecting the same first BLE advertisement packet simultaneously received by each of the plurality of slave advertisers from the selected master advertiser.

\* \* \* \* \*

UNITED STATES PATENT AND TRADEMARK OFFICE
CERTIFICATE OF CORRECTION

PATENT NO.         : 9,479,892 B2
APPLICATION NO.    : 14/219431
DATED              : October 25, 2016
INVENTOR(S)        : Jere Knaappila Page 1 of 1

It is certified that error appears in the above-identified patent and that said Letters Patent is hereby corrected as shown below:

In the Claims

In Claim 6, Column 7, Line 15, delete "$T\_advEvent_adv$" and insert -- $T\_advEvent_{adv}$ --

In Claim 6, Column 7, Line 17, delete "$T\_advEvent_adv$" and insert -- $T\_advEvent_{adv}$ --

In Claim 17, Column 9, Line 10, delete "the BLE" and insert -- BLE --

In Claim 17, Column 9, Line 23, delete "the BLE" and insert -- BLE --

In Claim 21, Column 10, Line 23, delete "a"

Signed and Sealed this
Tenth Day of January, 2017

Michelle K. Lee
*Director of the United States Patent and Trademark Office*